(12) United States Patent
Michmerhuizen et al.

(10) Patent No.: US 7,493,140 B2
(45) Date of Patent: Feb. 17, 2009

(54) SYSTEM, METHOD AND DEVICE FOR PROVIDING COMMUNICATION BETWEEN A VEHICLE AND A PLURALITY OF WIRELESS DEVICES HAVING DIFFERENT COMMUNICATION STANDARDS

(75) Inventors: Mark Michmerhuizen, Holland, MI (US); Timothy J. Syfert, Wyoming, MI (US); John D. Spencer, Allendale, MI (US); Joseph W. Strazanac, Holland, MI (US)

(73) Assignee: Johnson Controls Technology Company, Holland, MI (US)

( * ) Notice: Subject to any disclaimer, the term of this patent is extended or adjusted under 35 U.S.C. 154(b) by 84 days.

(21) Appl. No.: 10/543,209

(22) PCT Filed: Jan. 22, 2004

(86) PCT No.: PCT/US2004/001671

§ 371 (c)(1),
(2), (4) Date: Jul. 7, 2006

(87) PCT Pub. No.: WO2004/066514

PCT Pub. Date: Aug. 5, 2004

(65) Prior Publication Data
US 2006/0273878 A1 Dec. 7, 2006

Related U.S. Application Data

(60) Provisional application No. 60/441,863, filed on Jan. 22, 2003.

(51) Int. Cl.
*H04M 1/00* (2006.01)
(52) U.S. Cl. ............. 455/552.1; 455/432.1; 455/432.2; 455/432.3; 455/433; 340/5.27

(58) Field of Classification Search ................. 455/507, 455/74, 552.1, 88, 556.1, 557, 569.2; 701/1, 701/29
See application file for complete search history.

(56) References Cited

U.S. PATENT DOCUMENTS 6,009,363 A * 12/1999 Beckert et al. ............... 701/33

(Continued)

FOREIGN PATENT DOCUMENTS

| DE | 199 01 364 A1 | 7/1999 |
| EP | 1 127 746 A2 | 8/2001 |
| WO | WO 01/27829 A1 | 4/2001 |

OTHER PUBLICATIONS

R. Lind, R. Schumacher, R. Reger, R. Olney, H. Yen, M. Laur; "The Network Vehicle—A Glimpse into the Future of Mobile Multi-Media"; VDI-Berichte; 1415/1998; pp. 941-950; XP-002283072.

(Continued)

*Primary Examiner*—Matthew D Anderson
*Assistant Examiner*—Hai V Nguyen
(74) *Attorney, Agent, or Firm*—Foley & Lardner LLP

(57) ABSTRACT

A system for providing communication between a vehicle and a plurality of wireless devices includes a receiver configured to receive wireless signals from the wireless devices. The received wireless signals are provided in accordance with a communication standard from the plurality of communication standards. The system also includes a wireless data transfer module coupled to the receiver and configured to support the plurality of communication standards, process the wireless signals and direct the data of the wireless signals to a corresponding vehicle system. The system may include a transmitter coupled to the wireless data transfer module. The transmitter is configured to transmit wireless signals from the vehicle to the wireless devices. The wireless data transfer module receives data from a vehicle system and provides the data to the transmitter in accordance with a communication standard from the plurality of communication standards.

21 Claims, 3 Drawing Sheets

U.S. PATENT DOCUMENTS

| | | | |
|---|---|---|---|
| 6,157,317 A * | 12/2000 | Walker | 340/7.1 |
| 6,161,005 A * | 12/2000 | Pinzon | 455/403 |
| 6,338,010 B1 * | 1/2002 | Sparks et al. | 701/1 |
| 6,405,106 B1 | 7/2002 | Sheth et al. | |
| 6,690,947 B1 * | 2/2004 | Tom | 455/556.1 |
| 2002/0028690 A1 * | 3/2002 | McKenna et al. | 455/517 |
| 2002/0105968 A1 * | 8/2002 | Pruzan et al. | 370/465 |
| 2004/0037239 A1 * | 2/2004 | Gazzard | 370/328 |
| 2004/0076129 A1 * | 4/2004 | Vannucci | 370/335 |
| 2004/0142733 A1 * | 7/2004 | Parise | 455/572 |
| 2004/0203748 A1 * | 10/2004 | Kappes et al. | 455/432.1 |
| 2004/0230797 A1 * | 11/2004 | Ofek et al. | 713/168 |
| 2004/0235519 A1 * | 11/2004 | Frielink et al. | 455/557 |
| 2005/0027439 A1 * | 2/2005 | Schoepp | 701/200 |
| 2005/0048969 A1 * | 3/2005 | Shaheen et al. | 455/426.1 |
| 2005/0250440 A1 * | 11/2005 | Zhou et al. | 455/12.1 |

OTHER PUBLICATIONS

Dr. S. Schmitz, J. Kruppa, R. Pettit, Ch. Roser;,"Ein vielseitig einsetzbares schlüsselloses Zentralverriegelungssystem"; VDI-Berichte Nr., 1415/1998; pp. 259-279; XP002283073.

H. Lindenmeier, J. Hopf, L. Reiter, J. Brose, R. Kronberger; "Car Antenna Systems for Multimedia Applications"; VDI-Berichte, 1547/2000; pp. 741-770; XP002283075.

* cited by examiner

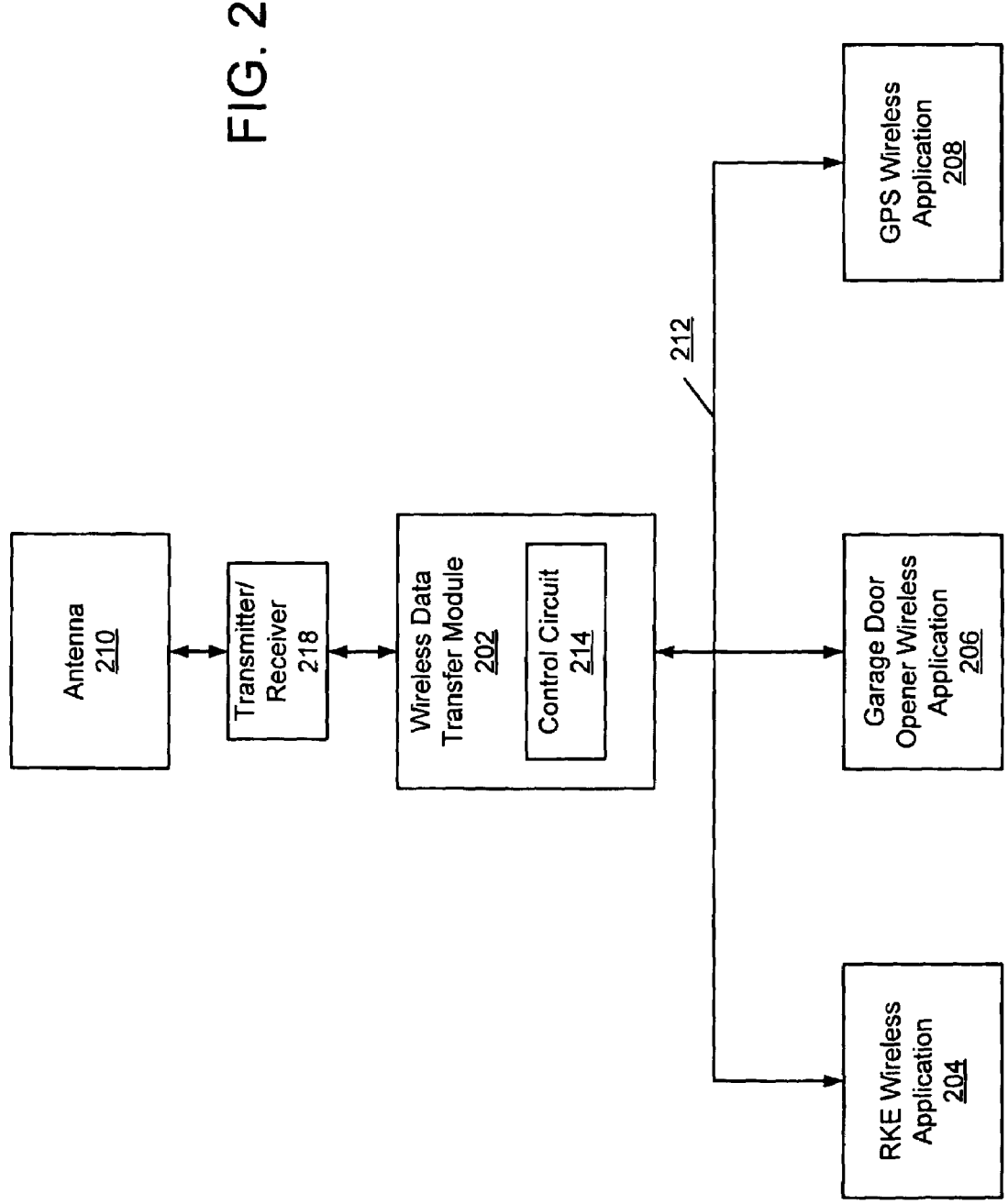

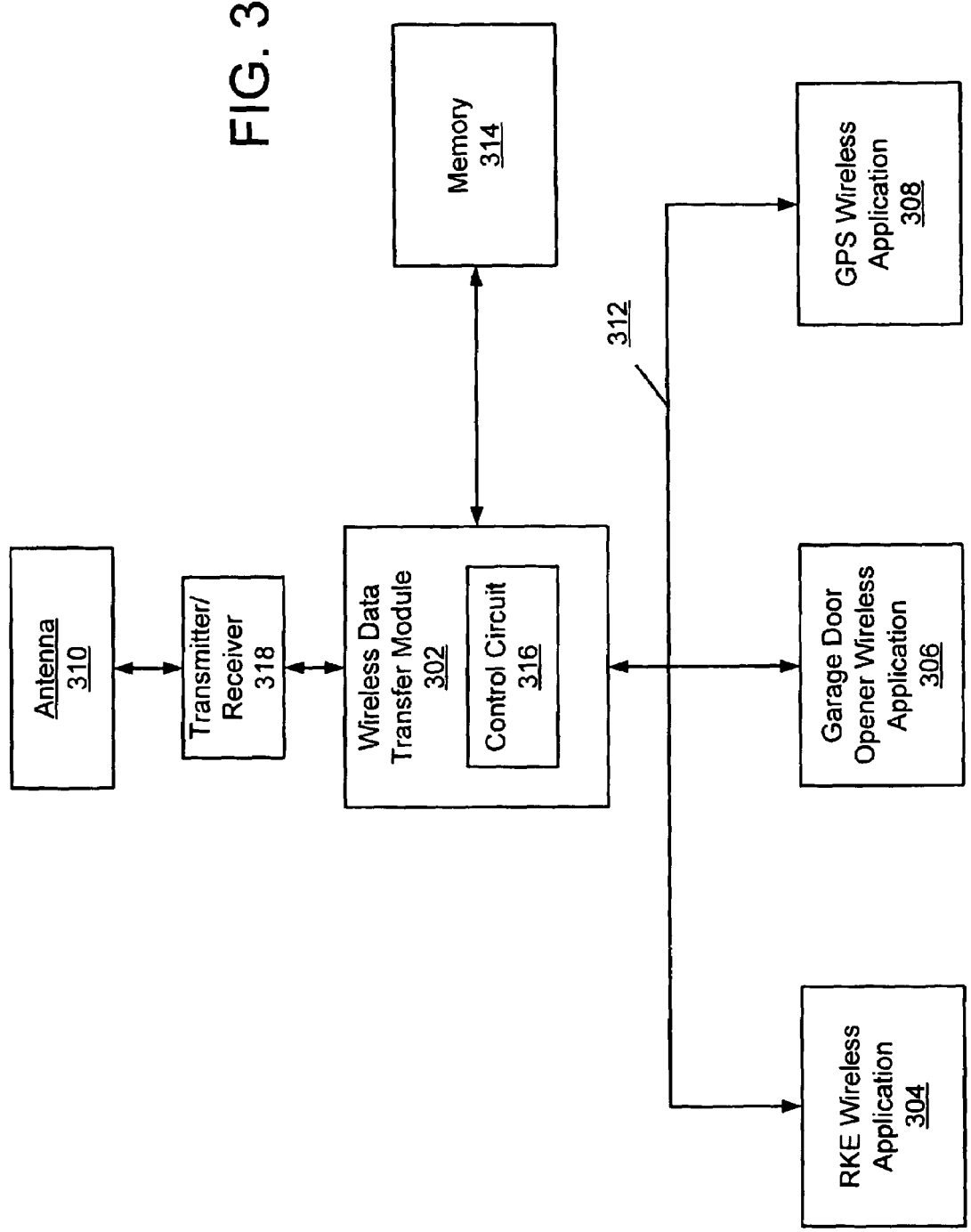

SYSTEM, METHOD AND DEVICE FOR PROVIDING COMMUNICATION BETWEEN A VEHICLE AND A PLURALITY OF WIRELESS DEVICES HAVING DIFFERENT COMMUNICATION STANDARDS

CROSS REFERENCE TO RELATED PATENT APPLICATION

This application claims the benefit of U.S. Provisional Application No. 60/441,863, filed Jan. 22, 2003.

FIELD OF THE INVENTION

The present invention relates to wireless communications in a vehicle and in particular, to a system, device and method for providing data communication between a vehicle and a plurality of wireless devices having a plurality of communication standards.

BACKGROUND OF THE INVENTION

Vehicles may interact with and/or include multiple wireless devices, such as a remote keyless entry (RKE) system and an integrated garage door opener. Typically, such wireless devices operate according to different communication standards. For example, a remote keyless entry (RKE) system may operate according to one communication standard and an integrated garage door opener may operate according to another communication standard. Examples of wireless communication standards used in vehicles include, for example, proprietary communication standards for tire pressure monitoring systems, Bluetooth, global positioning systems (GPS), IEEE 802.11b/a, cellular phone, WiFi, Zigbee, etc.

FIG. 1 is a schematic block diagram of a vehicle system for communication with multiple wireless devices. The system includes a separate communication module 102, 104 and 106 and interface 110, 112 and 114 for each communication standard. Each communication module houses the communication components for the particular communication standard. System 100 includes a garage door opener communication module 102, a RKE communication module 104 and a GPS communication module 106. RKE communication module 104 receives data from an RKE remote wireless device (e.g., a key FOB) via antenna 108 and forwards the data to the vehicle via interface 112. Accordingly, RKE communication module 104 serves as node for data transfer between the vehicle and the RKE remote wireless device. GPS communication module 106 serves as the node for data transfer between the vehicle and a remote GPS system and garage door opener communication module 102 serves as the node for data transfer between the vehicle and a remote garage door opener.

Accordingly, it would be advantageous to provide a system for providing communication between a vehicle and multiple wireless devices using a single data transfer module or node that is configured to support multiple wireless communication standards. It would also be advantageous to provide a wireless data transfer module in a vehicle that is configured to provide communication between the vehicle and a plurality of wireless devices operating via different communication standards.

SUMMARY OF THE INVENTION

In accordance with one embodiment of the invention, a system for providing communication between a vehicle having a plurality of vehicle systems and a plurality of wireless devices operating via a plurality of communication standards includes a receiver configured to receive wireless signals from at least one of the plurality of wireless devices, the wireless signals provided in accordance with a communication standard from the plurality of communication standards and having data and a wireless data transfer module coupled to the receiver, the wireless data transfer module configured to support the plurality of communication standards, to process the wireless signals and to direct the data from the wireless signals to a corresponding vehicle system.

In accordance with another embodiment of the invention, a wireless data transfer module for providing communication between a vehicle having a plurality of vehicle systems and a plurality of wireless devices operating via a plurality of communication standards includes an input configured to receive wireless signals from at least one of the plurality of wireless devices, the wireless signals provided in accordance with a communication standard from the plurality of communication standards and having data, a control circuit coupled to the input and configured to support the plurality of communication standards, to process the wireless signals and to direct the data from the wireless signals to a vehicle system, and an output coupled to the control circuit and configured to send the data to the vehicle system.

In accordance with another embodiment of the invention, a wireless data transfer module for providing communication between a vehicle having a plurality of vehicle systems and a plurality of wireless devices operating via a plurality of communication standards, includes an input configured to receive data from at least one vehicle system and a control circuit coupled to the input and configured to support the plurality of communication standards, to process the data and to provide the data to at least one wireless device in accordance with a communication standard.

In accordance with yet another embodiment of the invention, a method for providing communication between a vehicle having a plurality of vehicle systems and a plurality of wireless devices operating via a plurality of communication standards includes receiving wireless signals from at least one of the plurality of wireless devices, the wireless signals provided in accordance with a first communication standard and having data, processing the wireless signals based on the first communication standard using a wireless data transfer module configured to support the plurality of communication standards and distributing the data from the wireless signals to a vehicle system.

BRIEF DESCRIPTION OF THE DRAWINGS

The invention will be more readily understood by reference to the following description taken with the accompanying drawings, in which:

FIG. 2 is a schematic block diagram of a system for providing communication between a vehicle and a plurality of wireless devices in accordance with one embodiment.

FIG. 3 is a schematic block diagram of a system for providing communication between a vehicle and a plurality of wireless devices in accordance with an alternative embodiment.

DETAILED DESCRIPTION OF THE PREFERRED AND OTHER EXEMPLARY EMBODIMENTS

Figure 1:
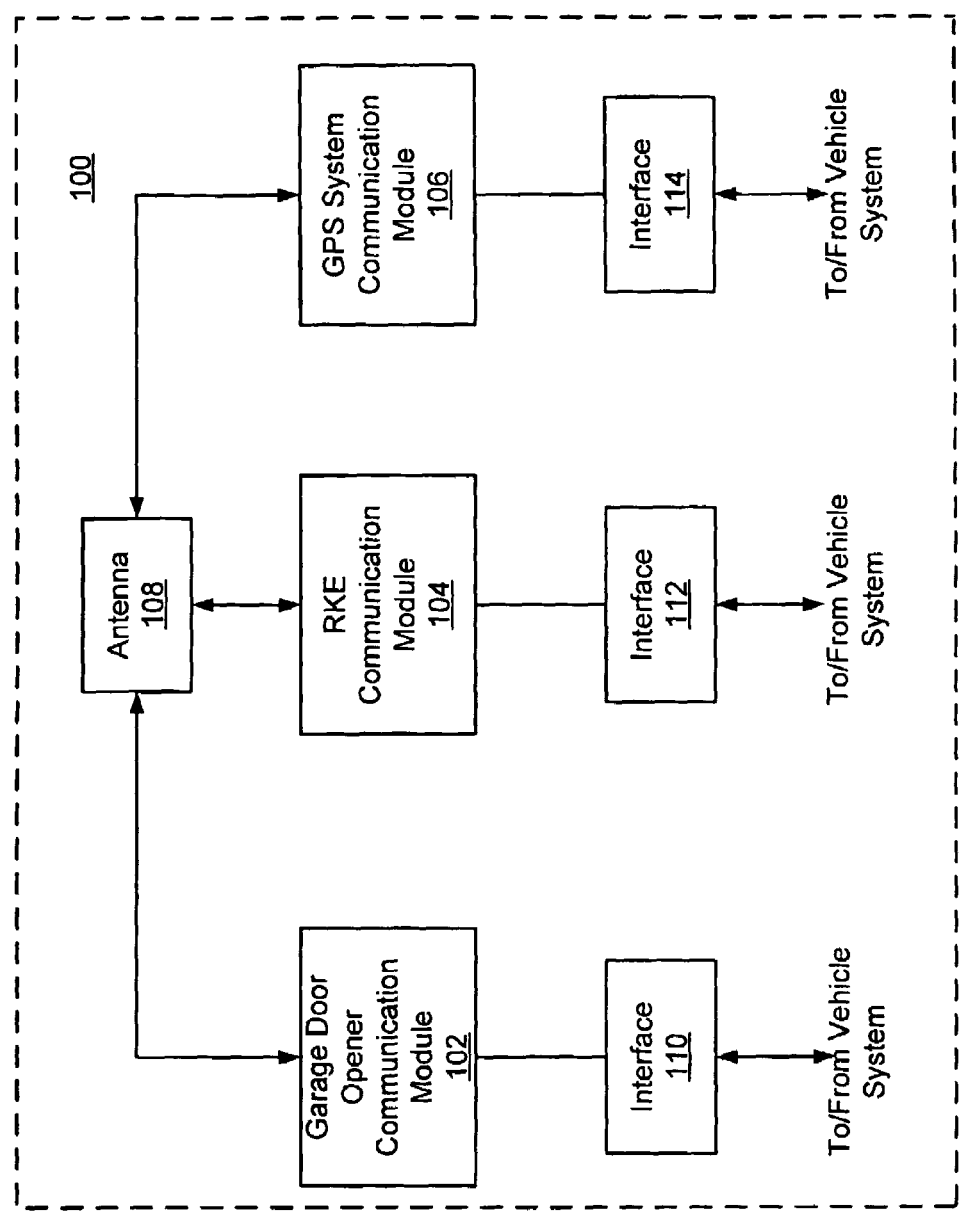
FIG. 1 is a schematic block diagram of a system for providing communication between a vehicle and a plurality of wireless devices.

FIG. 2 is a schematic block diagram of a system for providing communication between a vehicle and a plurality of wireless devices in accordance with one embodiment. A vehicle may be in communication with a plurality of wireless devices (not shown) such as a remote keyless entry (RKE) device (e.g., a key fob), a garage door opener, a global positioning system (GPS), portable electronic devices (e.g., a cellular phone, a PDA (personal digital assistant), an MP3 player, a DVD player, a portable computer, a pager, other audio and video devices, other multimedia devices, etc) and so on. The vehicle includes appropriate hardware for each wireless application (e.g., an integrated remote control system to provide control signals to a remote device (e.g., a garage door opener), a navigation system, power circuitry, user interfaces, etc.) and/or for utilizing data provided by the wireless device (e.g., an audio system to provide audio signals received from a wireless device, a display for video signals, etc.). In FIG. 2, the vehicle includes, for example, a remote keyless entry (RKE) application 204, a garage door opener application 206 and a GPS application 208. It should be understood that other vehicle applications or systems/subsystems than those shown in FIG. 2 may receive data from and/or send data to wireless devices. An antenna 210 in conjunction with a transmitter and receiver 218 receives wireless signals (e.g., RF signals) from wireless devices and transmits wireless signals from the vehicle to the wireless devices. The transmitter includes transmit circuitry configured to transmit wireless signals via antenna 210. The receiver includes receive circuitry configured to receive wireless signals from antenna 210. Alternatively, a single transceiver may be used that includes transmit and/or receive circuitry configured to transmit and receive data. The transmitter/receiver 218 may located anywhere within the vehicle. In one embodiment, the transmitter/receiver 218 is included in a wireless data transfer module 202.

Each wireless device (not shown) and the corresponding wireless application 204, 206, 208 or system/subsystem in the vehicle may operate in accordance with a different communication standard, for example, a proprietary communications standard for tire pressure monitoring systems, Bluetooth, WiFi, Zigbee, global positioning systems (GPS), IEEE 802.11 (wireless LAN), cellular, and so on. As shown in FIG. 2, a single wireless data transfer module 202 is coupled to and in signal communication with transmitter/receiver 218, antenna 210 and the wireless applications 204, 206, and 208 in the vehicle as well as to other systems/subsystems in the vehicle (not shown) such as an audio system, user interfaces, etc. In the embodiment of FIG. 2, wireless data transfer module 202 is in signal communication with wireless applications 204, 206 and 208 and other systems/subsystems (not shown) in the vehicle via a wired connection such as a communication bus in the vehicle. Wireless data transfer module 202 serves as the sole wireless data transfer point between the vehicle and any wireless device in communication with the vehicle. In a preferred embodiment, wireless data transfer module comprises a single circuit board. In one embodiment, the frequency of communications may be above 200 MHz.

Wireless data transfer module 202 includes a control circuit 214 and is configured to support a plurality of communication standards, such as RKE, GPS, Bluetooth, IEEE 802.11, cellular, Zigbee, WiFi, etc. Control circuit 214 of wireless data transfer module 202 is configured to decode wireless signals or messages received from wireless devices according to the appropriate communication standard for the wireless signals. Accordingly, wireless data transfer module 202 serves as a central distribution point for wireless signals received and transmitted by the vehicle. Control circuit 214 may include various types of control circuitry, digital and/or analog, and may include a microprocessor, microcontroller, application-specific integrated circuit (ASIC), or other circuitry configured to perform various input/output, control, analysis, and other functions to be described herein.

Wireless signals (e.g. RF signals) are received by wireless data transfer module 202 from wireless devices via antenna 210 and transmitter/receiver 218. Wireless data transfer module 202 identifies the communication standard associated with a received wireless signal and the wireless signal is decoded by control circuit 214 and assigned to the appropriate vehicle application or system/subsystem. Once control circuit 214 of wireless data transfer module 202 determines the appropriate vehicle application or system/subsystem of the vehicle, data from the wireless signal is distributed to the assigned vehicle application or vehicle system/subsystem. The wireless data may be transferred to the assigned vehicle application via a vehicle communication bus 212 such as a vehicle data bus.

For example, an RKE system (not shown), e.g., a key fob, may send a wireless signal to the vehicle, such as a command to unlock the doors. The RKE wireless signal is received by wireless data transfer module 202 and control circuit 214 via antenna 210. The RKE wireless signal is decoded by control circuit 214 and assigned to the RKE application 204 in the vehicle. RKE application 204 may, for example, comprise a module that includes power circuitry to lock and unlock the vehicle doors. The RKE data from the RKE wireless signal is transferred from the wireless data transfer module 202 to the RKE application 204 via vehicle bus 212. For example, control circuit 214 may send a bus message including the RKE data to a module of the RKE application that controls the power circuitry to fire a door unlock relay. Wireless signals from other wireless devices, such as a GPS system, a portable electronic device, etc., may also be received and distributed to a vehicle application using wireless data transfer module 202.

The wireless data transfer module 202 may also receive wireless data from a vehicle application 204, 206 and 208 or other vehicle systems/subsystems to be sent to a wireless device. Control circuit 214 of wireless data transfer module 202 is further configured to determine the communication standard and outgoing transmission path for the data based on the type of wireless devices in communication with the vehicle as well as the type of data to be transmitted. As mentioned, wireless data transfer module 202 supports multiple communication standards. As an example, garage door opener application 206 may provide data to the wireless data transfer module 202 in response to, for example, the actuation of a button by a passenger in the vehicle to send a signal to open a garage door. Control circuit 214 of wireless data transfer module 202 determines the appropriate transmission path for the control data which is then transmitted via a wireless signal to a corresponding garage door opener (not shown) via antenna 210 and transmitter 218. Wireless data transfer module 202 is also configured to distribute or share data between various vehicle applications or systems/subsystems.

Control circuit 214 of wireless data transfer module 202 may also be configured to receive data from vehicle applications or systems/subsystems and determine the best data transmission path for the outgoing data based on the type of outgoing data, the available communication hardware in the wireless data transfer module 202 and the available wireless devices (e.g., a cellular phone, a wireless LAN, a GPS system, etc.). Control circuit 214 may be configured to determine an optimal path for data received from wireless devices based on the available communication hardware in the wireless data transfer module 202 and/or the types of applications or systems/subsystems in the vehicle. The control circuit 214 may further be configured to determine the destination of data based on requests from vehicle applications. For example, if the GPS application 208 (e.g., a navigation system) has sent a wireless signal including a request for navigation data to a GPS system, the control circuit 214 may use this to determine the distribution of data received from the GPS system in response to the request.

FIG. 3 is a schematic block diagram of a system for providing communication between a vehicle and a plurality of wireless devices in accordance with an alternative embodiment of the invention. As discussed above with respect to FIG. 2, a vehicle may be in communication with a plurality of wireless devices (not shown) such as a remote keyless entry (RKE) device (e.g., a key fob), a garage door opener, a global positioning system (GPS), portable electronic devices (e.g., a cellular phone, a PDA (personal digital assistant), an MP3 player, a DVD player, a portable computer, a pager, other audio and video devices, other multimedia devices, etc) and so on. Accordingly, the vehicle includes appropriate hardware for each wireless application and/or for utilizing data provided by the wireless device. In FIG. 3, wireless data transfer module 302 is in signal communication with antenna 310, transmitter/receiver 318 and wireless applications 304, 306 and 308 as well as other systems/subsystems (not shown) in the vehicle. Antenna 310 in conjunction with transmitter/receiver 318 is used to receive wireless signals from wireless devices and transmit wireless signals from the vehicle to the wireless devices.

Each wireless device (not shown) and corresponding application 304, 306, 308 or system/subsystem may operate in accordance with a different communication standard, for example, a proprietary communications standard for tire pressure monitoring systems, Bluetooth, WiFi, Zigbee, global positioning systems (GPS), IEEE 802.11 (wireless LAN), cellular, and so on. As discussed above with respect to FIG. 2, wireless data transfer module 302 serves as the sole wireless data transfer point between the vehicle and any wireless device in communication with the vehicle. Wireless data transfer module 302 includes a control circuit 316 and is configured to support a plurality of communication standards, such as RKE, GPS, Bluetooth, IEEE 802.11b/a, etc. Accordingly, wireless data transfer module 302 serves as a central distribution point for wireless signals received and transmitted by the vehicle. Control circuit 316 may include various types of control circuitry, digital and/or analog, and may include a microprocessor, microcontroller, application-specific integrated circuit (ASIC), or other circuitry configured to perform various input/output, control, analysis, and other functions to be described herein.

Control circuit 316 and wireless data transfer module 302 are configured to operate in a similar manner as described above with respect to FIG. 2. Wireless signals are received by wireless data transfer module 302 from wireless devices via antenna 310 and receiver 318. Wireless data transfer module 302 identifies the communication standard associated with a received wireless signal and the wireless signal is decoded by control circuit 316 and assigned to the appropriate vehicle application. Control circuit 316 then distributes the data from the wireless signal to the assigned vehicle application via a communication bus 312 such as a vehicle data bus. Wireless data transfer module 302 may also receive wireless data from a vehicle application 304, 306 and 308 or other vehicle system/subsystem. Control circuit 316 of wireless data transfer module 302 is also configured to determine the outgoing transmission path for the data based on the type of wireless devices in communication with the vehicle.

The system of FIG. 3 also includes a memory 314 that is coupled to and in signal communication with wireless data transfer module 302. Memory 314 is configured to store wireless data received via wireless signals from wireless devices, vehicle applications 304, 306, 308 or other vehicle systems/subsystems (not shown). Memory 314 may be a storage device such as a hard drive, flash memory, etc. Control circuit 316 may be configured to store data from wireless signals from either a wireless device or vehicle application in memory 314 so that the data may be available for use at a later time. Control circuit 316 is also configured to retrieve data from memory 314. Data stored in memory 314 may be retrieved by wireless data transfer module 302 for use by the various vehicle applications 304, 306, 308 or other vehicle systems/subsystems or to be transmitted by a wireless signal to a wireless device. Accordingly, data may be also shared between vehicle applications (or other systems/subsystems) as well as between the vehicle applications and the wireless devices via memory 314 and wireless data transfer module 302. For example, the RKE application 304 may request data provided by a GPS system to the vehicle. Data may be transferred from memory 314 to vehicle applications 304, 306, 308 (or other vehicle systems/subsystems) or to the wireless data transfer module 302 via a communication bus 312 such as a vehicle bus 312.

Memory 314 may also be configured to store data to be transmitted from the vehicle to a wireless device until the desired optimal wireless device or means for wireless communication is available. Control circuit 316 is configured to store data in memory 314 and to retrieve the data when the wireless device or means for wireless communication is available to receive wireless signals. For example, a vehicle application or system/subsystem may have a large amount of data to send to a system outside the vehicle. The data may be stored in memory 314 until the vehicle is in range of, for example, a wireless LAN (i.e., 802.11b/a) connection rather than sending the data via another means, e.g., a cellular phone. In another example, data to be sent from GPS application 208 (e.g., a navigation system) may be stored in memory 314 until the vehicle is within range of a GPS system or until a GPS system is available. In other words, if the preferred wireless device or means for wireless communication with a wireless device is not available at the time data is ready to be sent, the data may be stored in memory 314 and retrieved by wireless data transfer module 302 when the preferred wireless device is available.

It is also important to note that the construction and arrangement of the elements of the wireless data transfer module as shown in the preferred and other exemplary embodiments are illustrative only. Although only a few embodiments of the present invention have been described in detail in this disclosure, those skilled in the art who review this disclosure will readily appreciate that many modifications are possible without materially departing from the novel teachings and advantages of the subject matter recited herein. Accordingly, all such modifications are intended to be included within the scope of the present invention as described herein. The order or sequence of any process or method steps may be varied or re-sequenced according to alternative embodiments. Other substitutions, modifications, changes and/or omissions may be made in the design, operating conditions and arrangement of the preferred and other exemplary embodiments without departing from the spirit of the present invention as expressed herein.

What is claimed is:

1. A wireless communication system for providing communication between a vehicle having a plurality of vehicle systems and a plurality of wireless devices operating via a plurality of communication standards, the system comprising:
   a receiver configured to receive wireless signals from the plurality of wireless devices, wherein the wireless signals are provided in accordance with the plurality of wireless communication standards and comprise first data; and
   a wireless data transfer module coupled to the receiver, the wireless data transfer module configured to support the plurality of wireless communication standards, to decode the wireless signals according to their respective wireless communication standards and to direct the first data of the wireless signals to at least one of the vehicle systems.

2. A system according to claim 1, further comprising:
   a transmitter coupled to the wireless data transfer module, the transmitter configured to transmit wireless signals from the vehicle to at least one of the plurality of wireless devices,
   wherein the wireless data transfer module receives second data from at least one of the vehicle systems and is further configured to provide the second data in accordance with a wireless communication standard from the plurality of wireless communication standards to the transmitter.

3. A system according to claim 2, wherein the wireless data transfer module is configured to determine a transmission path for the second data received from the vehicle system.

4. A system according to claim 3, wherein the wireless data transfer module determines the transmission path for the data received from the vehicle system based on a type associated with the data and an availability status of the plurality of wireless devices.

5. A system according to claim 2, further comprising a memory coupled to the vehicle systems and the wireless data transfer module and configured to store data from the vehicle systems.

6. A system according to claim 2, wherein the wireless communication standards for the first and second data are different wireless communication standards.

7. A system according to claim 1, wherein the wireless data transfer module comprises a single circuit board.

8. A system according to claim 1, wherein the wireless data transfer module directs data to a corresponding vehicle system via a communication bus.

9. A system according to claim 8, wherein the communication bus is a vehicle bus.

10. A system according to claim 1, wherein the wireless data transfer module is further configured to transfer first or second data between vehicle systems.

11. A system according to claim 1, further comprising a memory device coupled to the wireless data transfer module and configured to store data from the wireless signals.

12. A system according to claim 11, wherein the memory device is one of a hard drive or flash memory.

13. A wireless data transfer module comprising:
    an input configured to receive wireless signals from at least one of a plurality of wireless devices, the plurality of wireless devices operating via a plurality of wireless communication standards, wherein the wireless signals are provided in accordance with the plurality of wireless communication standards and comprise data;
    a control circuit coupled to the input and configured to support the plurality of wireless communication standards, to decode the wireless signals according to their respective wireless communication standards and to direct the data from the wireless signals to a vehicle system of a plurality of vehicle systems based on the data; and
    an output coupled to the control circuit and configured to send the data to the vehicle system.

14. A wireless data transfer module according to claim 13, wherein the control circuit is configured to determine a transmission path for the data based on the vehicle systems in the vehicle.

15. A wireless data transfer module according to claim 13, where the control circuit is configured to determine a transmission path for the data based on a request for data provided by at least one vehicle system.

16. A wireless data transfer module according to claim 13, wherein the control circuit directs data to a corresponding vehicle system via a communication bus.

17. A wireless data transfer module comprising:
    an input configured to receive data from at least one vehicle system;
    a control circuit coupled to the input and configured to support a plurality of wireless communication standards, to process the data from the plurality of vehicle systems so as to provide the data in accordance with a wireless communication standard from the plurality of wireless communication standards to at least one wireless device; and
    an output coupled to the control circuit and configured to communicate the data to the at least one wireless device in accordance with the wireless communication standard.

18. A wireless data transfer module according to claim 17, wherein the control circuit is configured to determine a transmission path for the data from the vehicle system based on at least a type associated with the data and the wireless devices in communication with the vehicle.

19. A method for providing wireless communication in a vehicle, the method comprising:
    receiving a first wireless signal from a first wireless device, the first wireless signal provided in accordance with a first wireless communication standard and having data;
    receiving a second wireless signal from a second wireless device, the second wireless signal provided in accordance with a second wireless communication standard and having data;
    decoding the first and second wireless signals based on the first and second wireless communication standards, respectively, using a wireless data transfer module configured to support at least the first and second wireless communication standards; and distributing the data from the first and second wireless signals to a first and second vehicle systems, respectively.

20. A method according to claim 19 further comprising:

processing data from the first and second vehicle systems based on the first and second wireless communication standards using the wireless data transfer module configured to support at least the first and second wireless communication standards; and transmitting the data to the first and second wireless devices in accordance with the first and second wireless communication standards, respectively.

21. A method according to claim 19 further comprising:

storing the decoded data prior to distributing the data to the first and second vehicle systems.

* * * * *